Feb. 14, 1933. J. S. PECKER 1,897,495
JIG
Filed Dec. 28, 1929
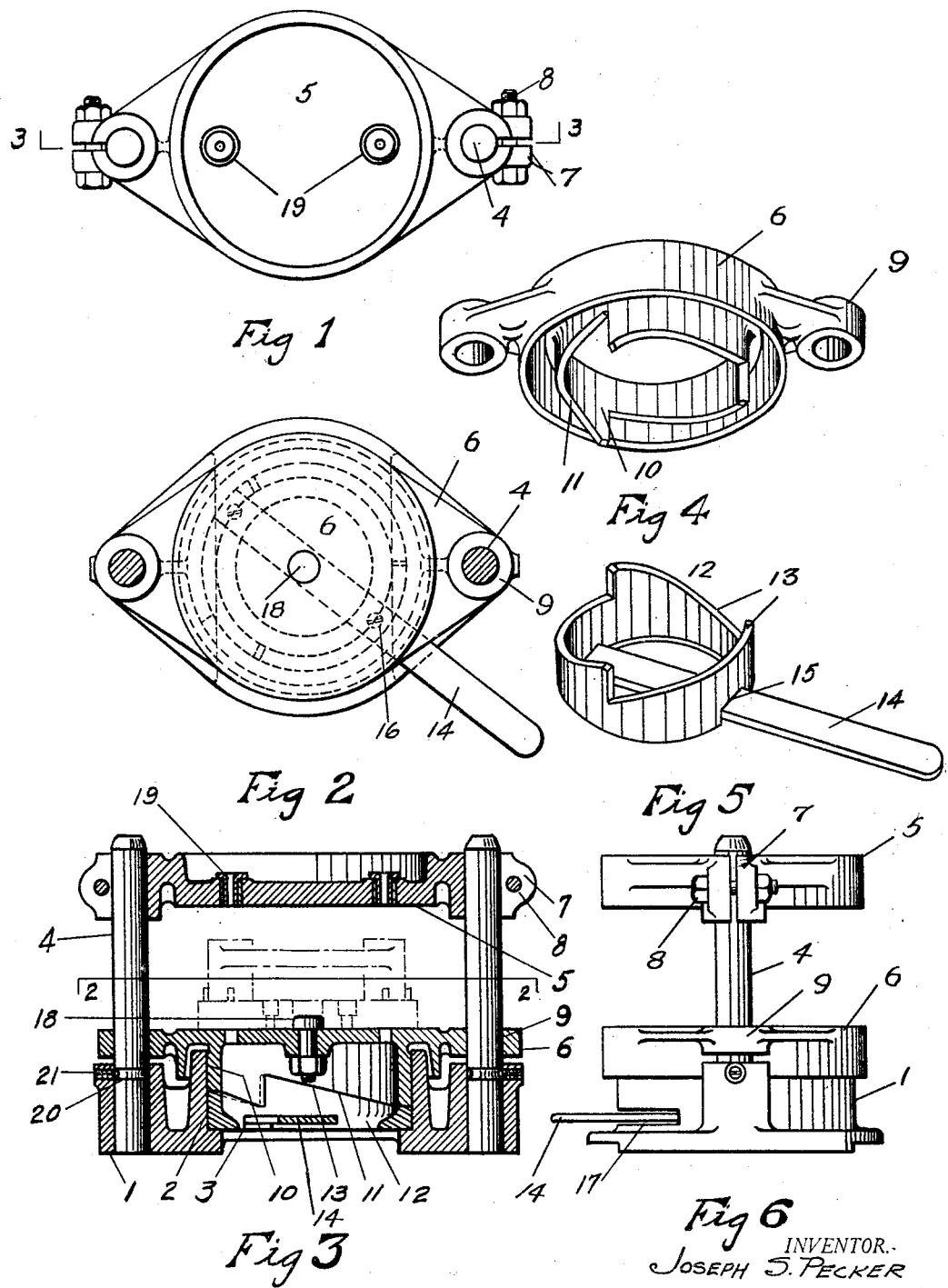
INVENTOR.
JOSEPH S. PECKER
BY Linton, Kellogg & Smith
ATTORNEY.

Patented Feb. 14, 1933

1,897,495

UNITED STATES PATENT OFFICE

JOSEPH S. PECKER, OF PHILADELPHIA, PENNSYLVANIA

JIG

Application filed December 28, 1929. Serial No. 417,206.

The present invention relates to a jig, and more particularly to a type of jig of the reciprocatory type, incorporating clamp members mounted for adjustments toward and away from each other and automatically locked in adjusted positions by the adjustor for the clamp members.

The principal object of the invention resides in the construction of a jig of relatively few parts which are assembled in a novel relation, one of the parts in the form of a cam element operating in a unique manner with the clamp plates to give the required adjustments thereto to produce a clamping operation, accomplishing this desired result in a manner that the strains created will bear an angular relation to the movement of the parts thereby automatically locking the parts against return to normal positions.

An object of the invention resides in the novel form of adjustor utilized whereby upon slight manipulation thereof by the operator, the work clamping plates will be adjusted toward each other and automatically locked, due to the coaction of the adjusting device with the clamp plates, the former operating in a horizontal plane while the latter operates in a vertical plane.

Another object of the invention relates to a construction of jig incorporating a movable work table coacting with a clamp plate which may be effectively clamped in any required adjustment with relation to the work table.

A feature of my invention resides in the novel compact arrangement and design of the work table and the base structure whereby the work table may have an interfitting connection with the base structure and cam action with a cam operating device interposed between the work table and the base structure whereby the former may be adjusted relative to the latter.

Another feature of my invention resides in the simplified manner of assembling the base structure, the adjusting device and the work table, which not only materially reduces production costs, particularly assembling operations, but enables the parts to have relative movements in an inexpensive manner.

Another feature of the invention relates to an improved type of clamp plate that directly carries the drill bushings and which is clamped in a stationary position during the work operation, thereby assuring an accurate alignment of the bushings with the drill spindles.

A further feature of my invention resides in the novel relation of parts whereby a stationary base structure is more or less rigidly connected to a clamp plate, a movable work table being interposed between the clamp plate and the base for vertical adjustments by a unique type of cam actuating adjustor.

Besides the above, my invention is distinguished in the construction of a jig of four major parts, a base structure that is stationary, a clamp plate in fixed relation with the base structure, a work table that is mounted for adjustments relative to the base structure and the clamp plate and an adjusting device in the form of a cam element interposed between the work table and the base and operating in a horizontal plane to give vertical movements to the work table.

With these and other objects in view the invention will be better understood from the following detailed description taken in connection with the accompanying drawing, wherein:

Figure 1 is a top plan view,

Figure 2 is a horizontal sectional view on the line 2—2 of Fig. 3,

Figure 3 is a vertical sectional view on the line 3—3 of Figure 1,

Figure 4 is a perspective view of the work table,

Figure 5 is a perspective view of the adjusting device,

Figure 6 is an end elevation.

In our modern methods of production, time is an important element, particularly in the performing of machine operations and therefore there has been a constant demand for improvements in jigs, the component parts of which must have an effective interlocking engagement with the work and capable of quick adjustments with very few operations. In the present invention the operation of the jig is dependent upon manipulation of a single lever connected to a cam device having a novel coaction with movable parts of the jig for adjusting the same and locking automatically. It is also important in a certain type of jigs that the various parts be properly aligned under all conditions to assure proper drilling operations and to accomplish this desirable objective the clamp plate in the present invention is rigidly clamped in adjusted positions to accurately align with the work during all operations.

Relating specifically to one embodiment of my invention as illustrated in the drawing, the numeral 1 designates a base structure which is in the form of a single casting, preferably provided with a central bore 2 and a shoulder 3 arranged contiguous to the bore. This base structure 1 removably supports the guide posts 4 which uprise from the base a predetermined distance to accommodate proper adjustments of the clamping means of my invention now to be described.

This clamping means consists of two primary parts, one a bushing plate designated by the numeral 5 and a work table designated by the numeral 6. The former is rigidly clamped in any required adjustment relative to the base structure, by providing the clamp plate with split sockets 7 that are slidably related with the posts 4 and effectively contracted there around by the bolts 8 which the clamp plate has been arranged in the required position. I wish to call attention to the fact that although the plate 5 is mounted for adjustments the same is rigidly connected to the guide posts when properly moved to position for engagement with the work, and thus it will be appreciated that the clamp plate 5 assumes a stationary position during the work operation.

The work table 6, the movable clamp member of the jig is also provided with sockets 9 slidably mounted on the guide posts. This table 6 carries a collar 10 projecting into and having slidable relation with the inner wall of the bore 2, and thus it will be appreciated that the work table and the base structure have a definite arrangement for accommodating sliding movements of the work table. The lower edge portion of the collar is provided with a plurality of cam surfaces 11 arranged in an annular formation so as to effectively cooperate with my novel form of adjusting device 12 now to be described.

My improved adjusting device 12 functions in a horizontal plane and as the work table 6 operates in a vertical plane, it will be understood that all stresses that the adjusting device 12 may be subject to in the use of the table 6 will bear an angular relation to the movement of the adjusting device and thus it will be appreciated that I eliminate the tendency of the adjusting device to return to normal position when subject to stresses during the clamping operation. This adjusting device in one of its forms, consists of a cam ring 12, loosely mounted on the shoulder 3 and provided with a plurality of cam surfaces 13 arranged in annular formation and directly co-acting with the cam surfaces 11. For the purpose of giving arcuate movement to the cam ring I provide a lever 14 fitting in notches 15 of the ring and directly secured thereto by means of the screw 16. This lever 14 projects through a slot 17 in the base structure so as to be positioned within convenient reach of the operator. To complete the invention I provide a center plug 18 for centering the work and provide the clamp plate 5 with a plurality of drill receiving bushings 19 which are utilized to properly guide drills and support the same in operative engagement with the work being acted upon. If found advantageous in practice, the guide posts may be removably arranged in place by providing the same with grooves 20 coacting with set screws 21 mounted in the base structure.

In the use of the device it is a very simple operation to swing the lever 14 in the required direction to accomplish a reaction between the cam surfaces of the ring and the cam surfaces of the work table. This action causes the work table to move toward the clamp plate 5 and thereby effectively clamp the work. Stresses created by the work clamped act in a vertical direction and as the cam ring 13 travels in a horizontal plane, it will be appreciated that the stresses may be utilized to automatically lock the parts against return to normal positions. This is a very important feature as a clamping operation may be accomplished with very little effort and return of the parts to normal position automatically prevented. Another feature of my invention resides in the utilization of a leverage and cam action in the accomplishment of a powerful clamping engagement between the jig and the work.

From the assembling standpoint it can be appreciated that I have made a valuable contribution to the art in providing the base with a bore and a shoulder which enables the cam ring to be easily dropped into place to loosely rest upon the shoulder 3 the latter forming the sole support for the ring. After this has been accomplished it is a very simple operation to secure the guide posts in position and slide the work table thereupon with the collar 10 moving into the bore 2 of the base. This aligning of parts assures proper contact between the cam surfaces on the table and the cam surfaces of the cam ring 13. As a final operation the clamp plate 5 is slid onto the guide posts and clamped in any required position. By the passage of the lever 14 through the slot 17 and securement to the clamp ring, it will be understood that the clamp ring is held against displacement.

It will now be appreciated that I have developed a very inexpensive type of jig and one possessing many meritorious features, particularly the sliding interfitting connections between the various parts and the novel manner of adjusting the table relative to a fixed clamp plate. As the clamp plate is held stationary during the work operation, it will be understood that there is no possibility of variation of alignment, facilitated by the fact that the drill receiving bushes retain a permanent position at all times. Attention is called to the fact that the clamp plate may be very quickly removed and a new one subsituted without destroying the assembly relation of the work table, base structure and adjusting device. Due to the novel formation, construction and association of component parts, ready accessibility is obtained and a quick removal of parts accomplished, features of vital importance in our present day methods of quantity production.

It is of course to be understood that the various parts of the jig may be designed in various other ways and associated in other relations and various other types of adjusting devices may be utilized in the general assembly and therefore I do not desire to be limited in protection in any manner whatsoever except as set forth in the following claim.

What I claim is:

A jig comprising a base structure having a centrally arranged bore and an annular shoulder at the bottom of the bore which projects inwardly thereof, guide posts upstanding from the base structure, a work table slidably supported by said guide posts and having an annular collar arranged in a tight sliding fit with the wall of said bore and provided with underlying cam surfaces, a clamp plate adjustably clamped to said guide posts for adjustments towards and away from said work table, an annular cam resting from said shoulder and having a snug turning fit in said bore and provided with cam surfaces coacting with said first mentioned cam surfaces and a lever fixed to said cam ring and projecting exteriorly through a slot in said base structure, said lever being horizontally disposed.

In witness whereof I have hereunto set my hand.

JOSEPH S. PECKER.